(12) United States Patent
Stefan

(10) Patent No.: US 6,640,186 B2
(45) Date of Patent: *Oct. 28, 2003

(54) METHOD AND SYSTEM FOR GENERATING A LIST OF MANEUVERS FOR NAVIGATION OF A VEHICLE

(75) Inventor: Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,632

(22) Filed: Apr. 16, 2001

(65) Prior Publication Data

US 2002/0152024 A1 Oct. 17, 2002

(51) Int. Cl.⁷ .............................................. G01C 21/30
(52) U.S. Cl. ......................... 701/209; 701/213; 701/24
(58) Field of Search ................................ 701/209, 208, 701/207, 210, 213, 201, 202, 23, 24

(56) References Cited

U.S. PATENT DOCUMENTS

| 5,414,630 A | * | 5/1995 | Oshizawa et al. | .......... 701/209 |
| 5,543,789 A | | 8/1996 | Behr et al. | |
| 5,675,492 A | * | 10/1997 | Tsuyuki et al. | ............. 701/209 |
| 5,774,071 A | * | 6/1998 | Konishi et al. | ............. 701/211 |
| 5,910,177 A | * | 6/1999 | Zuber | ......................... 701/202 |
| 6,298,305 B1 | * | 10/2001 | Kabada et al. | ............... 701/211 |
| 6,324,472 B1 | * | 11/2001 | O'Shea | ........................ 701/211 |
| 6,347,280 B1 | * | 2/2002 | Inoue et al. | ................ 701/202 |
| 6,427,119 B1 | | 7/2002 | Stefan et al. | |

OTHER PUBLICATIONS

U.S. patent application Ser. No. 09/837,409, Stefan et al., filed Apr. 18, 2001.

* cited by examiner

Primary Examiner—Richard M. Camby
(74) Attorney, Agent, or Firm—Anthony Luke Simon

(57) ABSTRACT

A method of generating navigation instructions for a vehicle is provided. A destination is requested at the vehicle and forwarded to a route generation application. At least one preliminary maneuver is calculated based on a current location of the vehicle and the destination. The preliminary maneuver is transmitted from the route generation application to the vehicle and is executed at the vehicle. Systems and programs for using the method are also provided.

22 Claims, 5 Drawing Sheets

500

METHOD AND SYSTEM FOR GENERATING A LIST OF MANEUVERS FOR NAVIGATION OF A VEHICLE

FIELD OF THE INVENTION

This invention relates generally to the navigation of a moving vehicle. In particular, this invention relates to a method and system of generating instructions for navigating the vehicle from a route generator.

BACKGROUND OF THE INVENTION

Currently it is possible to navigate a vehicle, such as a car, using a database onboard the car that includes directions and coordinates for various locations. For example, the database may include existing directions and coordinates for the entire United States. Such a navigation system is sometimes called an autonomous navigation system.

In existing autonomous navigation systems, the directions for navigating the vehicle are generated by a processor, which is also on board the vehicle. The processor accesses the database and calculates directions based on the current location of the vehicle and the intended destination. Autonomous navigation systems are typically very expensive. Additionally, these autonomous systems become easily outdated as the coordinates and locations and points of interest stored in the database become outdated.

One alternative to autonomous navigation systems is to communicate with a server that can calculate a navigation route and transmit it to the vehicle. Typically, in such a server-based system, the current location of the vehicle is determined by the server using Global Positioning Systems and software. Dead reckoning systems such as gyroscopes or the use of vehicle speed pulses may also be used to help determine the current location of the vehicle. The destination is also indicated to the server, for example, by user-input. Then, the server generates a route based on these two points.

This server-based process may be very time consuming. Sometimes, the process of downloading the maneuver list from the vehicle's current location to the destination may take a significant amount of time if the maneuver list is extensive. This may result in missed maneuvers or invalid routes as the vehicle continues beyond the original location upon which the maneuver lists were based. For example, a vehicle may pass the first maneuver before the instruction to navigate the first maneuver is downloaded. Moreover, current server-based navigation systems do not provide off-route detection, i.e. an indication that the vehicle has gone off the route indicated by the maneuver list. Additionally, current server-based navigation systems do not provide off-route correction. That is, because the database is not on board, there is a time lag between the time when a vehicle goes off-route and when the vehicle receives new maneuver instructions. This time lag may occur, for example, because the vehicle has to send a new request for a corrected route to the server based on a new current location.

It would be desirable therefore to provide a method for generating instructions for navigating a moving vehicle that overcomes the above.

SUMMARY OF THE INVENTION

One aspect of the present invention provides a method of generating navigation instructions for a vehicle. A destination is requested at the vehicle and forwarded to a route generation application. At least one preliminary maneuver is calculated based on a current location of the vehicle and the destination. The preliminary maneuver is transmitted from the route generation application to the vehicle and is executed at the vehicle. At least one remaining maneuver may be calculated while the vehicle executes the at least one preliminary maneuver. The remaining maneuver may be transmitted to the vehicle and executed. The at least one preliminary maneuver may comprise three maneuvers. All remaining maneuvers may also be calculated while the vehicle executes the at least one preliminary maneuver. All remaining maneuvers may be transmitted to the vehicle.

Another aspect of the present invention provides a navigation system including at least one route generation application wherein the route generation application calculates at least one preliminary maneuver before calculating any remaining maneuvers, at least one service manager for transmitting the at least one preliminary maneuver to a vehicle operatively adapted to execute the at least one preliminary maneuver. The system may also include at least one database in communication with the route generation application comprising location coordinates. The system may also include at least one navigation interface in communication with the vehicle operatively adapted to receive the at least one preliminary maneuver. The system may also include at least one communication interface in communication with the vehicle operatively adapted to transmit location information from the vehicle.

Another aspect of the present invention provides computer usable medium including a program for generating navigation instructions for a vehicle including computer program code that requests a destination at the vehicle, computer program code that forwards the destination to a route generation application, computer program code that calculates at least one preliminary maneuver based on a current location of the vehicle and the destination, computer program code that transmits the at least one preliminary maneuver from the route generation application to the vehicle and computer program code that executes the at least one preliminary maneuver at the vehicle. The program may also include computer program code that receives the at least one preliminary maneuver at the vehicle. The program may also include computer program code that calculates at least one remaining maneuver while the vehicle executes the at least one preliminary maneuver. The program may also include computer program code that transmits the at least one remaining maneuver to the vehicle and computer program code that executes the at least one remaining maneuver at the vehicle. The program may also include computer program code that receives the at least one remaining maneuver at the vehicle. The program may also include computer program code that calculates all remaining maneuvers while the vehicle executes the at least one preliminary maneuver and computer program code that transmits all remaining maneuvers at the vehicle. The program may also include computer program code that executes all remaining maneuvers at the vehicle.

Another aspect of the present invention provides a system for generating navigation instructions for a vehicle. The system includes means for requesting a destination at the vehicle and means for forwarding the destination to a route generation application. The system may also include means for calculating at least one preliminary maneuver based on a current location of the vehicle and the destination, means for transmitting the at least one preliminary maneuver from the route generation application to the vehicle and means for executing the at least one preliminary maneuver at the vehicle.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
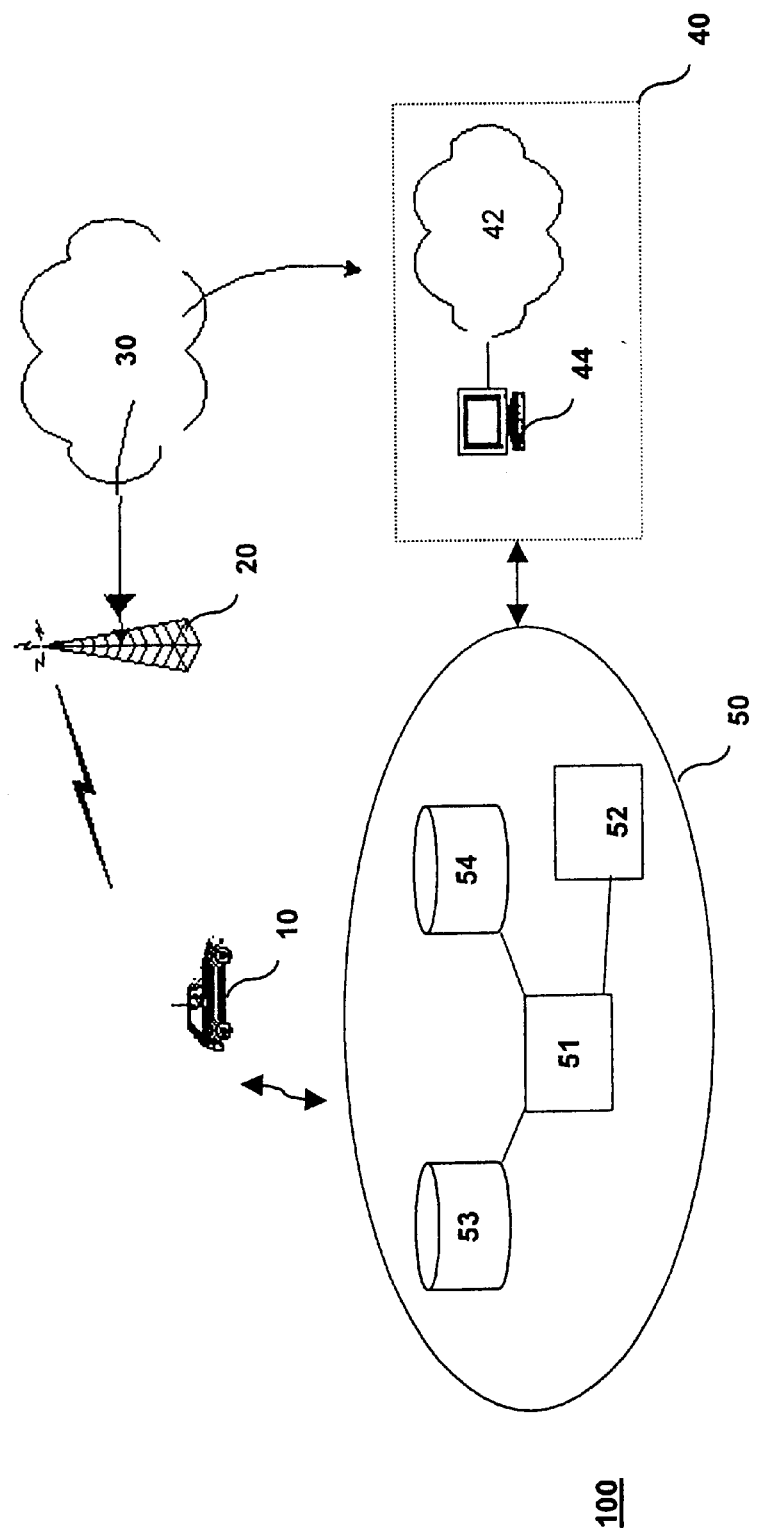
FIG. 1 is a schematic diagram of a system for generating navigation information for a vehicle in accordance with the present invention.

FIG. 1 shows one embodiment of a system for providing services to a vehicle in accordance with the present invention at 100. The system 100 may include one or more vehicle clients 10, one or more carrier systems 20, one or more communication networks 30, one or more service management subsystems 40 and one or more navigation subsystems 50. The service management subsystems 40 may comprise one or more service management applications 42 and one or more service managers 44. The navigation subsystems 50 may comprise one or more route applications 51, 52 and one or more coordinate databases 53, 54.

Navigation subsystem 50 may be a system for generating routes to be delivered to vehicle client 10 and for receiving route information from vehicle client 10. Navigation subsystem 50 may be connected with or in communication with service management subsystem 40. Service management subsystem 40 may be used to manage the delivery of information to or from navigation subsystem 50 to other parts of system 100. Routes may be delivered or information may be received via a live agent, such as a human advisor, or via a virtual agent, such as an interactive computer program.

Navigation subsystem 50 may be any suitable hardware or software configuration, or combination of hardware and software that is configured to generate a route, process route information or receive information from vehicle client 10. In one embodiment of the invention, navigation subsystem 50 comprises one or more route applications 51, 52 and one or more coordinate databases 53, 54. For example, route applications 51, 52 may be any suitable software application for generating route information or otherwise processing route information. Coordinate databases 53, 54 may be any suitable databases for storing route information, such as location coordinates.

Vehicle client 10 may be any suitable vehicle. The vehicle may be an automobile or a passenger-carrying unit, for example, a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 may be any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system 20 may be a separate transmitter/receiver carried by vehicle client 10.

Communication network 30 may be any suitable system for communicating between vehicle client 10 and service management subsystem 40. In one embodiment of the invention, communication network is a public switched telephone network (PSTN). Alternatively, communication network 30 may be a multiprotocol Internet or intranet capable of transmitting voice and/or data in either analog or digital form or a combination of both. Alternatively, communication network 30 may be a hybrid communication network or virtual network.

Service management subsystem 40 may be a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent, web channel, speech channel) and of the service (news, weather, sports, stocks, etc.). In one embodiment of the invention, service management subsystem comprises one or more application components 42 and one or more service managers 44. For example, application 42 may be any suitable software application for managing one or more services. Service managers 44 may be any suitable hardware and/or software configuration or structure for executing applications 42.

Figure 2:
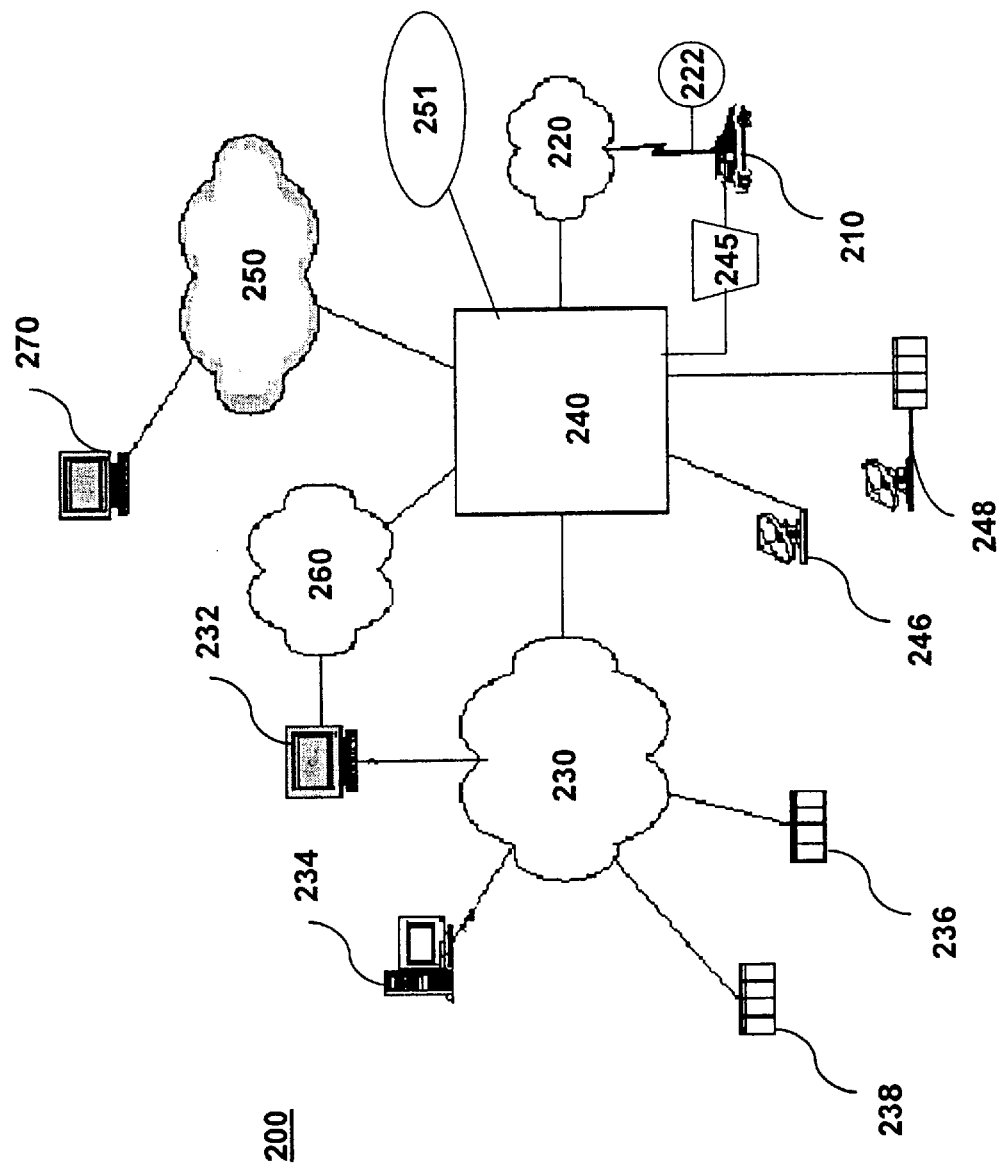
FIG. 2 is a schematic diagram of another embodiment of a system for generating navigation information for a vehicle in accordance with the present invention.

FIG. 2 shows another embodiment of a system for providing services to a vehicle in accordance with the present invention at 200. Vehicle-directed service system 200 may include a subscriber 210 and a service management application 240. In the embodiment shown in FIG. 2, the service management subsystem may be in connection with a communication network 230, such as the Internet. Service management application 240 may also be in communication with service applications or other service management subsystems. For example, in FIG. 2, service management subsystem 240 is also in communication with a subsystem for processing route information shown at 251. Service management subsystem 240 may also be in communication with a web-based service application or other web-based service management systems or web servers. For example, in FIG. 2, service management application 240 is in communication with a web channel 260.

In one embodiment of the invention, service management application may include an in-vehicle component 245. This in-vehicle component may be located in, or on or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a variety of services. For example, subscribers 210 may request route information or travel information or may provide information about their route, using voice commands in a conversational manner. Furthermore, the subscriber may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. For example, subscriber 210 may access email via this interface. In one embodiment of the invention, subscribers connect to the service management application 240 through the Internet 230 using standard Web browsers.

Subscriber 210 may also have GUI access through a web channel 260. This interface may be used by subscribers to access a variety of services. For example, subscriber 210 may maintain one or more user profiles using web channel 260. Subscriber 210 may also set up user-related rules such as e-mail consolidation and filtering rules. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscribers 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

As seen in FIG. 2, system 200 may also include one or more message servers 234. These messages may be, for example, voice or text or e-mail mail messages. In one embodiment of the invention, message servers 234 communicate with service management application 240 via Internet 230. Thus, subscribers 210 may receive incoming email messages from, and send outgoing e-mail messages to, external mail transport agents using any suitable messaging protocol as is well known in the art. Message servers 234 may also be used to retrieve subscribers' e-mail from outside mail storage servers for consolidation into their e-mail accounts connected to system 200.

As seen in FIG. 2, system 200 may also include one or more news and or sports feeds 236. In one embodiment of the invention, feeds 236 are provided by a network news content provider. Feeds 236 may be used to receive and store audio news and sports stories for playback to interested subscribers 210. The primary interface between the speech channel and news content provider 236 may be via the Internet 230. In one embodiment of the invention, a satellite feed 246 serves as a backup mechanism.

As seen in FIG. 2, system 200 may also include one or more weather services 248. In one embodiment of the invention, the services are provided by any suitable weather reporting service. Weather services 248 may be used to receive and store regional and local weather information for playback to interested subscribers 210. Furthermore, the weather content can be delivered based on the vehicle location by coordinating the weather zone with the vehicle GPS location. The weather service 248 and/or content feed may be co-located with the service management system 240.

System 200 may also include one or more finance services 238. For example, stock quotes may be provided to the subscriber. Any suitable finance technology may be used to provide these services to interested subscribers. In the embodiment of FIG. 2, the finance information is obtained at the time of the request through Internet attached content sources or dedicated connections 230 as is known in the art.

System 200 may also include other services to be delivered in addition to news, weather, sports and finance services as described above. For example, yellow pages listings, special interest content (e.g., movie or restaurant reviews), content related to the location of the vehicle (e.g. travel profiles of nearby tourist attractions) or content related to navigation of the vehicle may all be delivered via system 200.

Figure 3:
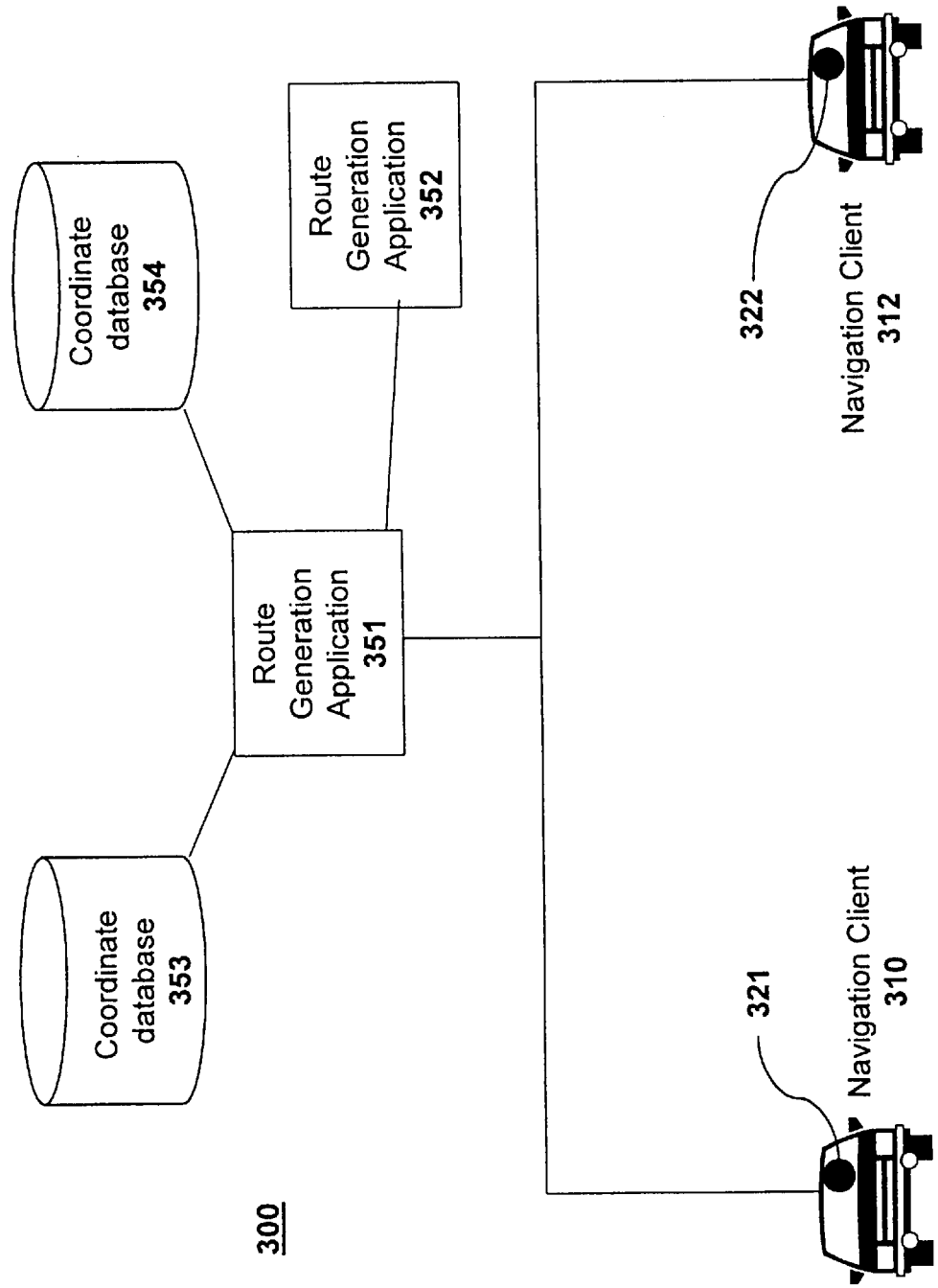
FIG. 3 is a schematic diagram of one embodiment of a navigation subsystem in accordance with the present invention.

FIG. 3 shows one embodiment of a navigation system in accordance with the present invention at 300. Navigation system 300 may include one or more navigation clients 310, 312. Each navigation client 310, 312 may have an invehicle navigator 321, 322. Navigation system 300 may also include one or more route generation applications 351, 352. Navigation system 300 may also include one or more coordinate databases 353, 354.

Navigation clients 310, 312 may be a vehicle client as described above.

In-vehicle navigator 321, 322 may be any suitable component of navigation client 310, 312 which may be used to navigate vehicle client 310. 312. For example, in-vehicle navigator 321, 322 may be a driver. Alternatively, in-vehicle navigator 321, 322 may be an automatic system for navigating vehicle 310, 312.

Route generation applications 351, 352 may be any suitable application for calculating maneuver lists of directions between one or more locations. For example, route generation applications 351, 352 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 351, 352 are in communication with coordinate databases 353, 354.

Route generation applications 351, 352 may generate navigation information in any suitable manner. For example, route generation applications 351, 352 may generate routes using geocoding. That is, the application 351, 352 determines a corresponding latitude and longitude based on an input navigation address. Alternatively, route generation applications 351, 352 may generate routes using reverse geocoding. That is, the application 351, 352 determines a corresponding navigation address based on input latitude and longitude coordinates.

Coordinate databases 353, 354 may be any suitable databases for storing such location coordinates as latitude and longitude of a variety of locations. These locations may be, for example, points of interest. Coordinate databases 353, 354 may also be a database of street addresses. Coordinate databases 353, 354 may also be a database of routes between points.

Figure 4:
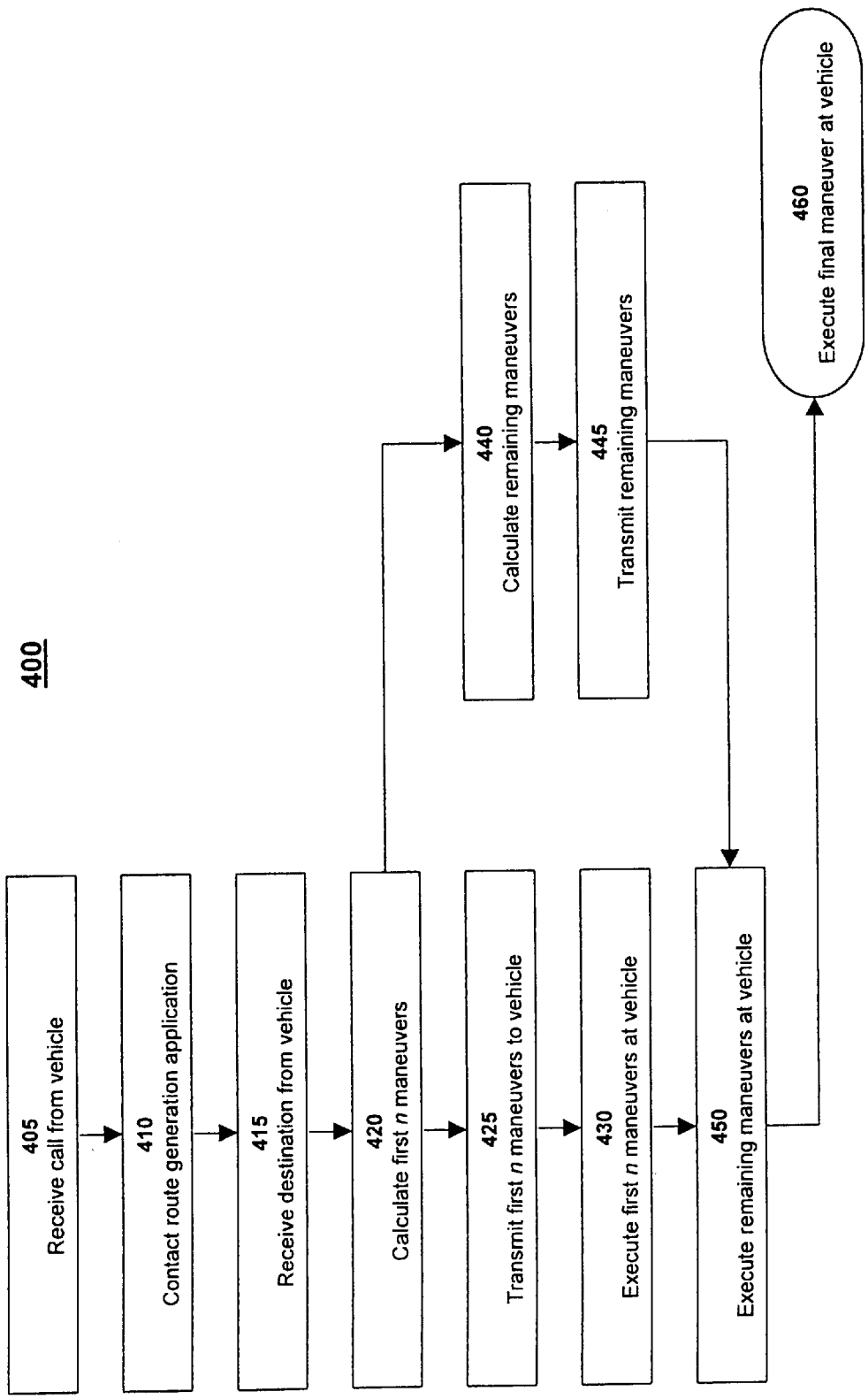
FIG. 4 is a flow diagram of one embodiment of a method for generating navigation information for a vehicle in accordance with the present invention.

FIG. 4 shows a flow diagram of one embodiment of a method for generating navigation information in accordance with the present invention at 400.

As seen at block 405, a call may be received from vehicle client 310, 312. For example, this call may be a request transmitted from the vehicle indicating a request for directions. Alternatively, the call may comprise a transmission of the coordinates of the vehicle. As described above, the call may be one or more voice commands from vehicle client 310, 312. For example, service management subsystem 40 may communicate with vehicle client 310, 312 via a VUI or GUI.

As seen at block 410, the route generation application 351, 352 may be contacted. This contact may occur, for example, via a service management subsystem as described above. Alternatively, vehicle client 310, 312 may contact the route generation application directly.

As seen at block 415, the vehicle's destination may be received from the vehicle client 310, 312. This may take the form of a request for a particular destination from the service management subsystem and a response from the vehicle client. Alternatively, this may take the form of a request from route generation application 351, 352 and a response from the vehicle client. For example, vehicle client 310, 312 may provide a destination to route generation application 351, 352. Vehicle client 310, 312 may provide the destination via any suitable means, for example, voice commands. Alternatively, an in-vehicle hardware component as described above may automatically upload the destination. The destination may also be determined from a pre-stored address book, for example, an address book stored in any suitable place within system 100, 200 that includes the current destination of the vehicle. That is, the vehicle client 310, 312 may indicate that the destination is "Home" and the actual coordinates may already be pre-stored for example, in the vehicle, in a database in communication with the vehicle client or in a database in communication with the route generation application.

As seen at block 420, route generation application may then calculate a first set of maneuvers. These maneuvers may be, for example, maneuvers to be accomplished by vehicle client 310, 312 in order to reach the destination indicated at block 415. Route generation application may calculate the first n maneuvers, where n may be any suitable number of maneuvers. In one embodiment of the invention, n=3. The value of n may be determined according to any suitable criteria.

In one embodiment of the invention, n is based on vehicle speed. For example, n may be a lower value when the vehicle speed is high. Route generation application 351, 352 may receive input parameters from vehicle client 310, 312 to determine n. For example, these parameters may include the destination of the vehicle client, the current location of the vehicle client, the distance between the destination and the current location and the speed of vehicle client. In a case where the destination is close to the current location and the vehicle is traveling very quickly, the value of n may be low. In one embodiment of the invention, n may be a higher value when the road network density is high. For example, in older or more crowded subdivisions, streets are very close or dense. Thus, although vehicle client is going slowly, there are many roads and potential maneuvers to navigate in a short period of time so n may be a higher value to provide vehicle client 310, 312 with navigation information in time for the vehicle client to perform the maneuver.

In one embodiment of the invention, n is a value submitted by a user of vehicle client 310, 312. Alternatively, n may be a value calculated by an on-board component of vehicle client 310, 312 that is submitted to route generation application 351, 352 for use in the route calculations.

These maneuvers or navigation instructions may be calculated using any standard methods. In one embodiment of the invention, the maneuvers are calculated based on graph theory or are based on a shortest path algorithm, such as Dijkstra's algorithm. Alternatively, the maneuver list may be calculated based on an A* algorithm which include heuristics or other information for pointing the vehicle in the appropriate direction.

The maneuvers may be calculated by determining the current location and calculating to the destination location. Alternatively, the maneuvers may be calculated using the destination location and calculating to the current location. Alternatively, the maneuvers may be calculated by first using the current location and calculating to the n maneuver. Alternatively, the maneuvers may be calculated by using the n maneuver and calculating to the current location. For example, the A* algorithm utilizes an evaluation function to determine the shortest distance from the navigation client's staring location to a destination. As another example, a variant of Dijkstra's algorithm calculates maneuvers in a forward and backward direction and, beginning at the first maneuver point calculates to the current location by probing out all road sections and intersections. Alternatively, the maneuvers may be calculated using a main maneuver point (such as, but not limited to, the first maneuver point or the n maneuver points) and calculating to the destination while the destination is also being calculated towards the current or starting point. The maneuvers may be calculated such that the destination is used to help eliminate alternate paths as an appropriate path is calculated.

In addition to shortest route, the maneuver list may be calculated based on any suitable criteria, including, but not limited to, the most use of freeways or the least use of freeways, shortest time, toll road avoidance, scenic route, inclusion and/or exclusion of specific road segments, inclusion and/or exclusion of real-time traffic information or traffic-influenced routes, or criteria manually input by the user.

As seen at block 425, the first n maneuvers may then be transmitted from route generation application to vehicle client 310, 312. The first n maneuvers may be downloaded to the vehicle client, for example, via service management subsystem 240. Alternatively, the first n maneuvers may be downloaded directly to vehicle client 310, 312 by route generation application 351, 352. The first n maneuvers may be made available to a navigator 321, 322 of the vehicle. The first n maneuvers may be available, for example, via a VUI as described above. In one embodiment of the invention, the first n maneuvers are downloaded automatically to the navigator 321, 322.

As seen at block 430, the vehicle 310, 312 may immediately execute the first n maneuvers. For example, navigator 321, 322 may be guided to complete the first n maneuvers by voice commands. Once the navigator has performed the first maneuver, the sequence may immediately advance to the next maneuver automatically. Alternatively, vehicle client 310, 312 may prompt for the next direction after the first maneuver has been executed. Alternatively, vehicle client 310, 312 may execute the maneuvers automatically as they are downloaded to vehicle client 310, 312.

Meanwhile, as seen at block 440, route generation application may continue to calculate the remaining maneuvers. This may occur, for example, while the vehicle is executing the first n maneuvers as indicated at block 430. Alternatively, this may occur while the first n maneuvers are being downloaded to the vehicle at block 425.

The remaining maneuvers or navigation instructions may be calculated using any standard methods, for example, those described above. For example, the remaining maneuvers may be calculated by completing the calculations begun at block 420 above, based on the current location and destination location. Alternatively, the remaining maneuvers may be calculated using the nth location of the vehicle and its relation to the destination location. The remaining maneuvers may be calculated such that the destination is used to help eliminate alternate paths as an appropriate path is calculated.

The remaining maneuvers or navigation instructions may be calculated based on any suitable criteria, for example those described above. For example, the remaining maneuvers may be calculated based criteria including, but not limited to, shortest route, the most use of freeways or the least use of freeways, shortest time, toll road avoidance, scenic route, inclusion and/or exclusion of specific road segments, inclusion and/or exclusion of real-time traffic information or traffic-influenced routes, or criteria manually input by the user.

As seen at block 445, the remaining maneuvers may then be transmitted to the vehicle client. This may occur, for example, while the vehicle is still executing the first n maneuvers as indicated at block 430. The remaining maneuvers may be downloaded, for example, via service management subsystem 240. Alternatively, the remaining maneuvers may be downloaded directly to vehicle client 310, 312. The remaining maneuvers may be made available to a navigator 321, 322 of the vehicle. The remaining maneuvers may be available, for example, via a VUI as described above. In one embodiment of the invention, the remaining maneuvers are downloaded automatically to the navigator 321, 322.

As seen at block 450, the vehicle client may then execute the remaining maneuvers. For example, navigator 321, 322 may be guided to complete the first n maneuvers by voice commands. Once the navigator has performed the first maneuver, the sequence may immediately advance to the next maneuver automatically. Alternatively, vehicle client 310, 312 may prompt for the remaining maneuvers after the first n maneuvers have been executed. Alternatively, vehicle client 310, 312 may execute the maneuvers automatically as they are downloaded to vehicle client 310, 312.

As seen at block 460, the vehicle may then execute the final maneuver, arriving at the destination. In one embodiment of the invention, an arrival message is presented to the navigation client. The route calculations may then be terminated. The route may be stored for future use, for example, it may be stored at the navigation client, at the coordinate database or at any suitable component of the system.

Figure 5:
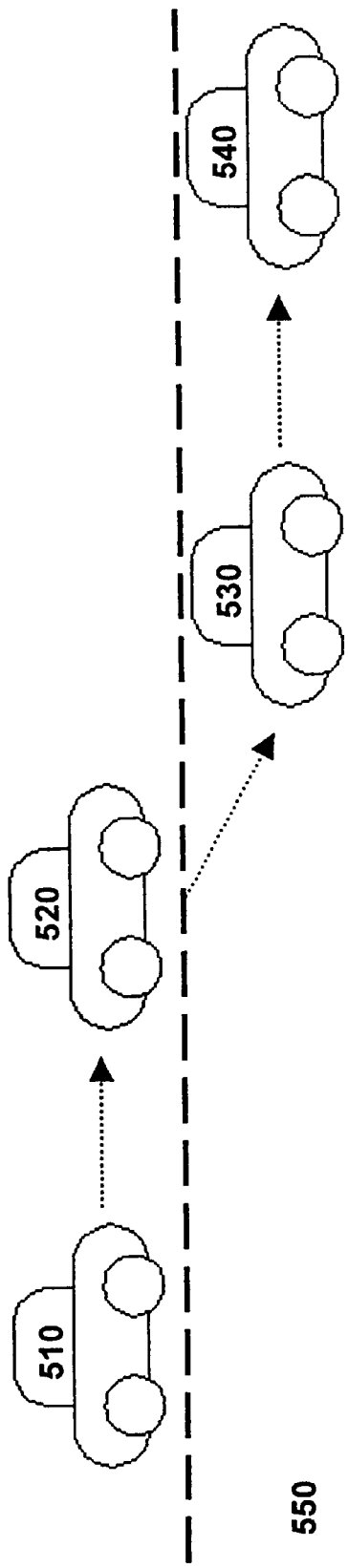
FIG. 5 is a sequence diagram of one embodiment of a method for generating navigation information for a vehicle in accordance with the present invention.

FIG. 5 shows a sequence diagram of one embodiment of a method for generating navigation information in accordance with the present invention at 500.

Positions 510, 520, 530 and 540 indicate positions of vehicle client 310, 312 on a route 550. Position 510 may be a current location of the vehicle client. Positions 520 and 530 may be intermediate locations on the route 550. Position 540 may be the destination of the vehicle client on route 550.

As vehicle client 310, 312 is at position 510, the coordinates of position 510 may be uploaded to route generation application 351, 352. The coordinates of position 540 may also be uploaded to route generation 351, 352 at this time.

As vehicle client moves away from position 510, route generation application may already calculate the first n maneuvers in accordance with the present invention. In the example shown in FIG. 5, there are only two intermediate maneuvers until destination 540. Thus, in this example, the first n maneuver is the maneuver to position 520, i.e. only the first 1 maneuver is calculated. However, any possible of maneuvers may be intermediate maneuvers and any possible first n maneuvers may be calculated prior to downloading to the vehicle.

As vehicle client moves away from position 510, route generation application 351, 352 may then download the first n maneuvers to the vehicle as described above. Thus, instructions to move to position 520 are downloaded in the example shown in FIG. 5.

As vehicle client receives instructions to move to position 520 (i.e. receives the first n maneuver), route generation application may then be generating the remaining maneuvers and downloading them to vehicle client 310, 312. In the example of FIG. 5, two remaining maneuvers are left (i.e. the move to position 530 and from there to destination 540). Thus, as vehicle 310, 312 executes the maneuver to position 520, instructions for the moves to positions 530 and 540 may already be downloaded. Vehicle client is able to begin executing maneuvers before the list of maneuvers to be executed is completed.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of remotely generating a series of navigation instructions for a vehicle, comprising:
   forwarding a destination request from the vehicle to a service manager, the service manager comprising a route generation application;
   calculating, at the remote route generation application, at least one preliminary maneuver based on a current location of the vehicle and the destination request; and
   transmitting the at least one preliminary maneuver from the route generation application to the vehicle via the service manager.

2. The method of claim 1, further comprising:
   receiving the destination request at the service manager.

3. The method of claim 2, further comprising:
   forwarding the destination request to the route generation application from the service manager.

4. The method of claim 1, further comprising:
   executing the at least one preliminary maneuver at the vehicle.

5. The method of claim 1 further comprising:
   calculating, at the remote route generation application, at least one remaining maneuver while the vehicle executes the at least one preliminary maneuver.

6. The method of claim 5 further comprising:
   transmitting the at least one remaining maneuver from the remote route generation application to the vehicle via the service manager.

7. The method of claim 6 further comprising:
   downloading the at least one remaining maneuver at the vehicle.

8. The method of claim 6 further comprising:
   executing the at least one remaining maneuver at the vehicle.

9. The method of claim 1, further comprising:
   calculating, at the remote route generation application, all remaining maneuvers while the vehicle executes the at least one preliminary maneuver.

10. The method of claim 9, further comprising:
    transmitting all remaining maneuvers from the remote route generation application to the vehicle via the service manager.

11. The method of claim 1, further comprising:
    determining, at the service manager, the current location of the vehicle; and
    transmitting the current location of the vehicle to the remote route generation application from the service manager.

12. The method of claim 1, further comprising:
    transmitting the current location of the vehicle from the vehicle to the service manager.

13. A navigation system comprising:
    a service manager;
    a remote route generation application in communication with the service manager for calculating at least one preliminary maneuver;
    a remote service provider in communication with the service manager for transmitting the at least one preliminary maneuver to a vehicle, wherein the vehicle executes the at least one preliminary maneuver upon receiving the preliminary maneuver from the remote service provider;
    at least one database in communication with the service manager, the database comprising location coordinates; and
    at least one navigation interface in communication with the vehicle, wherein the navigation interface receives the at least one preliminary maneuver from the remote service provider.

14. The system of claim 13 wherein the remote route generation application further calculates at least one remaining maneuver to be transmitted to the vehicle.

15. The system of claim 13 wherein the remote service provider determines a current location of the vehicle.

16. The system of claim 13 further comprising:
    at least one communication interface in communication with the vehicle, wherein the communication interface transmits a current location of the vehicle from the vehicle to the service manager.

17. A computer usable medium including a program for generating a series of navigation instructions for a vehicle, comprising:
    computer program code that forwards a destination request from the vehicle to a service management system, the service management system comprising a route generation application;
    computer program code that calculates, at the remote route generation application, at least one preliminary maneuver based on a current location of the vehicle and the destination request; and
    computer program code that transmits the at least one preliminary maneuver from the route generation application to the vehicle via the service management system.

18. The program of claim 17, further comprising:
    computer program code that receives the destination request at the service manager; and
    computer program code that forwards the destination request to the route generation application from the service manager.

19. The program of claim 17 further comprising:
    computer program code that calculates, at the remote route generation application, at least one remaining maneuver while the vehicle executes the at least one preliminary maneuver; and
    computer program code that transmits the at least one remaining maneuver from the remote route generation application to the vehicle via the service manager.

20. The program of claim 17, further comprising:
    computer program code that calculates, at the remote route generation application, all remaining maneuvers while the vehicle executes the at least one preliminary maneuver; and
    computer program code that transmits all remaining maneuvers from the remote route generation application to the vehicle via the service manager.

21. The program of claim 17, further comprising:
    computer program code that determines, at the service manager, the current location of the vehicle; and
    computer program code that transmits the current location of the vehicle to the remote route generation application from the service manager.

22. The program of claim 17, further comprising:
    computer program code that transmits the current location of the vehicle from the vehicle to the service manager.

* * * * *